(12) United States Patent
Herdt et al.

(10) Patent No.: US 8,398,781 B2
(45) Date of Patent: Mar. 19, 2013

(54) METHODS FOR CLEANING INDUSTRIAL EQUIPMENT WITH PRE-TREATMENT

(75) Inventors: Brandon Leon Herdt, Hastings, MN (US); Peter J. Fernholz, Burnsville, MN (US)

(73) Assignee: Ecolab USA Inc., St. Paul, MN (US)

( * ) Notice: Subject to any disclaimer, the term of this patent is extended or adjusted under 35 U.S.C. 154(b) by 1032 days.

(21) Appl. No.: 10/928,774

(22) Filed: Aug. 27, 2004

(65) Prior Publication Data

US 2006/0046945 A1 Mar. 2, 2006

(51) Int. Cl.
*B08B 3/04* (2006.01)
*C11D 1/00* (2006.01)
*C11D 1/66* (2006.01)

(52) U.S. Cl. ............ 134/26; 134/27; 134/28; 134/29; 134/36; 510/218; 510/234; 510/372; 510/421; 510/435; 510/505; 510/506

(58) Field of Classification Search ........... 510/218, 510/234, 372, 421, 435, 505, 506; 134/26, 134/27, 28, 29, 36
See application file for complete search history.

(56) References Cited

U.S. PATENT DOCUMENTS

| | | | |
|---|---|---|---|
| 4,094,953 A | 6/1978 | Hadi et al. | |
| 4,695,290 A | 9/1987 | Kindig et al. | |
| 4,740,308 A | 4/1988 | Fremont et al. | |
| 4,753,033 A | 6/1988 | Kindig | |
| 5,021,096 A | 6/1991 | Abadi | |
| 5,481,084 A | 1/1996 | Patrick et al. | |
| 5,567,444 A * | 10/1996 | Hei et al. | 424/616 |
| 5,725,678 A | 3/1998 | Cannon et al. | |
| 5,954,851 A | 9/1999 | Sakae | |
| 5,993,562 A | 11/1999 | Roelofs | |
| 5,998,358 A | 12/1999 | Herdt et al. | |
| 6,071,356 A * | 6/2000 | Olsen | 134/26 |
| 6,176,971 B1 | 1/2001 | Sun Yu et al. | |
| 6,221,323 B1 | 4/2001 | Mizuno et al. | |
| 6,306,252 B1 | 10/2001 | Ryham | |
| 6,436,445 B1 * | 8/2002 | Hei et al. | 424/667 |
| 6,472,199 B1 * | 10/2002 | Monken | 435/264 |
| 2002/0177220 A1 | 11/2002 | Monken | |
| 2003/0087786 A1 * | 5/2003 | Hei et al. | 510/375 |
| 2004/0007255 A1 | 1/2004 | Labib | |
| 2004/0029755 A1 * | 2/2004 | Bragulla | 510/218 |
| 2005/0183744 A1 * | 8/2005 | Staub et al. | 134/22.1 |

FOREIGN PATENT DOCUMENTS

| | | |
|---|---|---|
| DE | 19804829 | 8/1999 |
| EP | 0751211 | 1/1997 |
| EP | 0772971 | 5/1997 |
| WO | WO2005/090542 | 9/2005 |

* cited by examiner

*Primary Examiner* — Gregory Delcotto
(74) *Attorney, Agent, or Firm* — Andrew D. Sorensen; Laura C. DiLorenzo; Amy J. Hoffman

(57) ABSTRACT

A method of cleaning equipment such as heat exchangers, evaporators, tanks and other industrial equipment using clean-in-place procedures and a pre-treatment solution prior to the conventional CIP cleaning process. The pre-treatment step improves the degree of softening of the soil, and thus facilitates its removal. The pre-treatment solution can be a strong acidic solution, a strong alkaline solution, or comprise a penetrant. A preferred strong acidic solution is an acid peroxide solution. In some embodiments, the pre-treatment may include no strong alkali or acid ingredient; rather, the penetrant provides acceptable levels of pre-treatment.

10 Claims, 1 Drawing Sheet

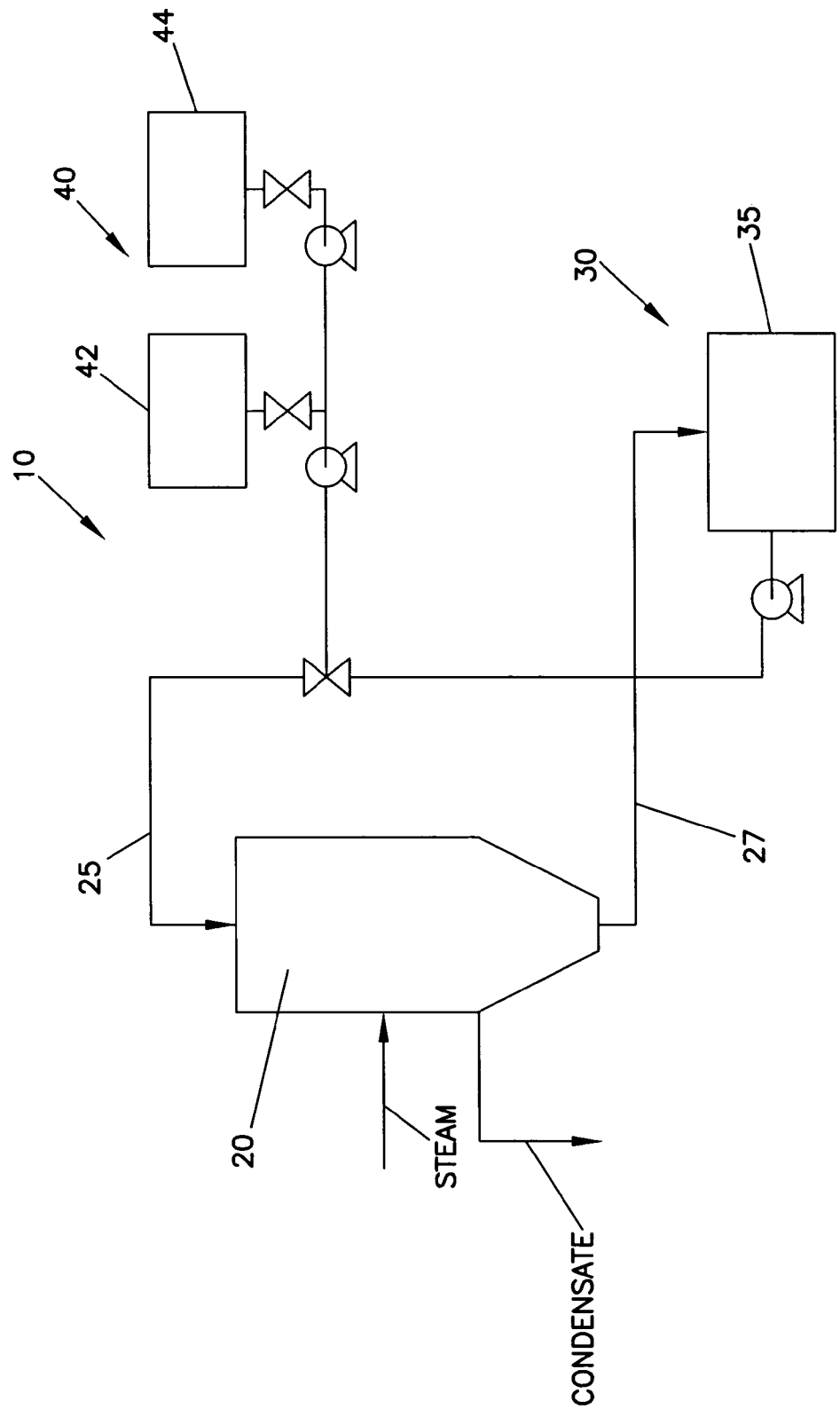

METHODS FOR CLEANING INDUSTRIAL EQUIPMENT WITH PRE-TREATMENT

FIELD

The invention relates to cleaning of industrial equipment such as evaporators, heat exchanger and other such equipment that is conventionally cleaned using a CIP (clean-in-place) process.

BACKGROUND

In many industrial applications, such as the manufacture of foods and beverages, hard surfaces commonly become contaminated with carbohydrate, proteinaceous, hardness soils and other soils. Such soils can arise from the manufacture of both liquid and solid foodstuffs. Carbohydrate soils, such as cellulosics, monosaccharides, disaccharides, oligosaccharides, starches, gums and other complex materials, when dried, can form tough, hard to remove soils, particularly when combined with other soil components such as proteins, enzymes, fats, oils and others. The removal of such carbohydrate soils can be a significant problem. Similarly, other materials such as proteins, enzymes, fats and oils can also form hard to remove soil and residues.

Clean-in-place cleaning techniques are a specific cleaning regimen adapted for removing soils from the internal components of tanks, lines, pumps and other process equipment used for processing typically liquid product streams such as beverages, milk, juices, etc. Clean-in-place cleaning involves passing cleaning solutions through the system without dismantling any system components. The minimum clean-in-place technique involves passing the cleaning solution through the equipment and then resuming normal processing. Any product contaminated by cleaner residue can be discarded. Often clean-in-place methods involve a first rinse, the application of the cleaning solutions, a second rinse with potable water followed by resumed operations. The process can also include any other contacting step in which a rinse, acidic or basic functional fluid, solvent or other cleaning component such as hot water, cold water, etc. can be contacted with the equipment at any step during the process. Often the final potable water rinse is skipped in order to prevent contamination of the equipment with bacteria following the cleaning sanitizing step.

Clean-in-place processing requires a complete shutdown of the equipment being cleaned, which results in lost production time. Many times, the equipment is not thoroughly cleaned, due to the large downtime needed. What is needed is an improved method for cleaning this equipment, using the clean-in-place process, which uses less time to thoroughly remove the soils.

SUMMARY OF THE DISCLOSURE

The invention relates to methods of cleaning equipment such as heat exchangers, evaporators, tanks and other industrial equipment using clean-in-place procedures. The method is suitable for organic soil removal or, more particularly, for food soil removal. Further, the method relates to cleaning processes for removing carbohydrate and proteinaceous soils from beverage manufacturing locations using a clean-in-place method. The method includes using a pre-treatment or pre-treating step prior to the conventional cleaning process.

In one aspect, the invention is directed to a method that includes pre-treating the soiled surfaces with a strong acidic solution. A conventional clean-in-place process follows this pre-treatment step. A preferred strong acidic solution is an acid peroxide solution. It has been found that a conventional clean-in-place process using an alkaline detergent after the strong acidic pre-treatment step provides particularly effective results. The concentration of the active ingredients in an acidic pre-treatment solution is at least 0.3% and usually at least 0.6%.

In another aspect, the invention is directed to a method that includes pre-treating the soiled surfaces with a strong alkaline solution. A conventional clean-in-place process follows this pre-treatment step. It has been found that a conventional clean-in-place process using an acidic detergent after the strong alkaline pre-treatment step provides particularly effective results.

Either of the pre-treatments, either acidic or alkaline, may include a penetrant. The addition of a penetrant improves the degree of softening of the soil, and thus facilitates the removal of the soil. The concentration of acid plus peroxide in a pre-treatment solution is at least 0.5% and usually at least 0.7%. A concentration of about 1% is typical.

In another aspect, the invention is directed to a method that includes pre-treating the soiled surfaces with a penetrant, without the presence of appreciable amounts of acid or alkaline. A conventional clean-in-place process follows this penetrant pre-treatment step. The concentration of penetrant in the pre-treatment solution is at least 0.25% and usually is at least 0.5%. In one particular embodiment, the penetrant pre-treatment solution comprises approximately 0.9% of a blend of glycol ether solvents; other levels of glycol ethers as penetrants are suitable.

In one particular embodiment, the invention is to a method of cleaning soils from industrial equipment using a CIP process. The method includes applying a pre-treatment solution to the soil, the solution comprising at least 0.25 wt-% active ingredients, with the active ingredients including any of an alkaline source, an acidic source, a penetrant, an oxidizer, and a builder. The method also includes recirculating a first CIP solution through the equipment after the pre-treatment solution, the CIP solution comprising a dilute detergent and then rinsing the equipment. The pre-treatment solution can have 0.25 to 1.5 wt-% acid and 0.01 to 1 wt-% oxidant, such as a peroxide. A penetrant, such as glycol ether, may be present at 0.4 to 10 wt-%.

In another particular embodiment, the method includes pre-treating the soil with a pre-treatment solution comprising at least 0.5 wt-% active ingredients, the active ingredients including any of an alkaline source, an acidic source, a penetrant, an oxidizer, a surfactant, and a builder, removing at least a portion of the penetrated soil with a dilute detergent solution, and rinsing the equipment. In some embodiments, the pre-treatment solution includes an alkaline source and the dilute detergent includes an acid. In other embodiments, the pre-treatment solution includes an acid source and the dilute detergent is basic.

The present invention includes using two different CIP solutions.

Additional details regarding pre-treatment solutions and methods of using pre-treatment solutions are provided below.

BRIEF DESCRIPTION OF THE DRAWINGS

FIG. 1 is a schematic diagram of an industrial process that includes equipment to be cleaned, CIP process equipment, and pre-treatment equipment.

DETAILED DESCRIPTION OF THE INVENTION

The present invention is directed to cleaning of industrial equipment using a pre-treatment step in combination with clean-in-place procedures. Use of a pre-treatment step, in combination with conventional clean-in-place solutions and processes, provides increased soil removal than the conventional process alone. Additionally, use of a pre-treatment step, followed by a water rinse, provided unexpected amounts of soil removal. Use of a pre-treatment step allows the use of traditionally incompatible chemistries.

As used herein, "weight percent", "wt-%", "percent by weight", "% by weight", and variations thereof refer to the concentration of a substance as the weight of that substance divided by the total weight of the composition and multiplied by 100. It is understood that, as used here, "percent", "%", and the like are intended to be synonymous with "weight percent", "wt-%", etc.

As used herein, the term "about" refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

It should be noted that, as used in this specification and the appended claims, the singular forms "a," "an" and "the" include plural referents unless the content clearly dictates otherwise. Thus, for example, reference to a composition containing "a compound" includes having two or more compounds. It should also be noted that the term "or" is generally employed in its sense including "and/or" unless the content clearly dictates otherwise.

The method of the present invention applies to equipment generally cleaned using clean-in-place (i.e., CIP) cleaning procedures. Examples of such equipment include evaporators, heat exchangers (including tube-in-tube exchangers and plate-in-frame exchangers), heating coils (Including steam, flame or heat transfer fluid heated) re-crystalizers, pan crystalizers, spray dryers, drum dryers, and tanks. This method can be used in generally any application where caked on soil or burned on soil, such as proteins or carbohydrates, needs to be removed; applications include the food industry (especially dairy), brewing, oil processing, industrial agriculture and ethanol processing.

CIP processing is generally well-known. The process includes applying a dilute solution (typically about 0.5-3%) onto the surface to be cleaned. The solution cascades across the surface (typically drains down), slowly removing the soil. Either new solution is re-applied to the surface, or the same solution is recirculated and re-applied to the surface.

A typical CIP process to remove a soil (including organic, inorganic or a mixture of the two components) includes at least three steps: an alkaline solution rinse, an acid solution rinse, and then a water wash. The alkaline solution softens the soils and removes the organic alkaline soluble soils. The subsequent acid solution removes mineral soils left behind by the alkaline cleaning step. The strength of the alkaline and acid solutions and the duration of the cleaning steps are typically dependent on the durability of the soil. The water rinse removes any residual solution and soils, and cleans the surface prior to the equipment being returned on-line. The present invention provides a pre-treatment step, prior to the CIP process, which penetrates into the soil. The penetrating materials soften the soil, act as a catalyst, or otherwise enhance the activity of the conventional CIP solution when it contacts the soil. Thus, the pre-treatment facilitates the soil removal.

Referring now to FIG. 1, a schematic diagram of process equipment is illustrated at reference numeral 10. Process 10 includes a tank 20, which is the equipment to be cleaned. A feed line 25 supplies the various cleaning solutions to tank 20, and a drain line 27 removes solution from tank 20. Operably connected via appropriate pipes, valves, pumps, etc. is equipment for a CIP process, designated as reference numeral 30. CIP process 30 includes a tank 35 for retaining the dilute CIP chemistry. Drain line 27 from tank 20 is used to recirculate solution from tank 20 back to CIP process 30 and tank 35. Process 10 also includes equipment for the pre-treatment process, designated as reference numeral 40. Pre-treatment equipment 40 includes a first tank 42 and a second tank 44. When two tanks are used, generally one tank, e.g., tank 42, will contain an alkaline pre-treatment and the other tank, e.g., tank 44, will contain an acidic pre-treatment. The appropriate pipes, valves, pumps, etc. are in place for operably connecting tanks 42, 44 with feed line 25 into tank 20. This set-up of process 10 allows a pre-treatment to be applied to tank 20 without the use of large amounts of additional equipment, such as piping. Additional details regarding the method of cleaning tank 20 is described below.

The Pre-Treatment Solution

As described above, the pre-treatment solution or pre-treatment step is applied to the soil prior to the application of conventional CIP chemistries. The chemistry of the pre-treatment solution is selected to facilitate removal of the soils on the surfaces to be cleaned. The pre-treatment solution pre-coats and penetrates into the soil, softening the soil. The specific chemistry used can be selected based on the soil to be removed. The chemistry used can be compatible with the CIP chemistry. In some embodiments, it is desired to have a pre-treatment that is incompatible with the CIP chemistry; in such instances, the pre-treatment reacts with the CIP chemistry. It has been found that using incompatible chemistries further increases the soil-removal effectiveness.

The pre-treatment solution comprises at least 0.25% of active ingredients, typically at least 0.5%, preferably at least 2% and more preferably at least 4%. By use of the term "active ingredients" what is intended is the non-inert ingredients that facilitate the softening, dissolving and removal of soil. These active ingredients include any alkaline/base, acid, penetrant (including surfactant), builder, oxidizer, catalyst and chelant or chelating agent. In most embodiments, water is the remainder of the solution. Typically, the solution has no more than about 15% active ingredients, preferably no more than about 10%. For most applications, a concentration of about 1-10% is preferred; a concentration of about 2-5% is suitable for most applications.

Alkaline or Acidic Ingredients

The pre-treatment solution optionally and preferably includes alkaline or acidic ingredients. Examples of suitable alkaline sources include basic salts, amines, morpholine, carbonates and silicates. Particularly preferred alkaline sources include NaOH (sodium hydroxide), KOH (potassium hydroxide), TEA (triethanol amine), DEA (diethanol amine), and MEA (monoethanol amine), sodium metasilicate and potassium silicate.

Examples of suitable acidic sources include mineral acids (such as phosphoric acid, nitric acid, sulfuric acid), and organic acids (such as lactic acid, acetic acid, hydroxyacetic acid, citric acid, glutamic acid, glutaric acid).

The amount of alkaline or acid in the pre-treatment solution is typically at least 0.25 wt-% and no greater than 10 wt-%. Common levels of alkaline or acid include 2 to 5 wt-% and 0.5 to 1.5 wt-%.

Penetrants

A penetrant may be present in the pre-treatment solution. The penetrant may be combined with an alkaline or acid source in the solution, or, the penetrant may be used without an alkaline or acid source. Preferably, the penetrant is water soluble.

Examples of suitable penetrants include alcohols, short chain ethoxylated alcohols and phenol (having 1-6 ethoxylate groups). Organic solvents are also suitable penetrants. Examples of suitable organic solvents, for use as a penetrant, include esters, ethers, ketones, amines, and nitrated and chlorinated hydrocarbons.

Another preferred class of penetrants is ethoxylated alcohols. Examples of ethoxylated alcohols include alky, aryl, and alkylaryl alkloxylates. These alkloxylates can be further modified by capping with chlorine-, bromine-, benzyl-, methyl-, ethyl-, propyl-, butyl- and alkyl-. A preferred level of ethoxylated alcohols in the solution is 1 to 20 wt-%.

Another class of preferred solvents for use as penetrants is glycol ethers, which are water soluble. Examples of glycol ethers include dipropylene glycol methyl ether (available under the trade designation DOWANOL DPM from Dow Chemical Co.), diethylene glycol methyl ether (available under the trade designation DOWANOL DM from Dow Chemical Co.), and propylene glycol methyl ether (available under the trade designation DOWANOL PM from Dow Chemical Co.). A preferred level of glycol ether in the solution is 0.5 to 20 wt-%.

Surfactants also are a suitable penetrant for use in the pre-treatment solution. Examples of suitable surfactants include nonionic, cationic, and anionic surfactants. Nonionic surfactants are preferred. Nonionic surfactants improve soil removal and can reduce the contact angle of the solution on the surface being treated. Examples of suitable nonionic surfactants include alkyl-, aryl-, and arylalkyl-, alkoxylates, alkylpolyglycosides and their derivatives, amines and their derivatives, and amides and their derivatives. Additional useful nonionic surfactants include those having a polyalkylene oxide polymer as a portion of the surfactant molecule. Such nonionic surfactants include, for example, chlorine-, benzyl-, methyl-, ethyl-, propyl-, butyl- and other like alkyl-capped polyoxyethylene and/or polyoxypropylene glycol ethers of fatty alcohols; polyalkylene oxide free nonionics such as alkyl polyglycosides; sorbitan and sucrose esters and their ethoxylates; alkoxylated ethylene diamine; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and ethoxylated amines and ether amines and other like nonionic compounds. Silicone surfactants can also be used.

Additional suitable nonionic surfactants having a polyalkylene oxide polymer portion include nonionic surfactants of C6-C24 alcohol ethoxylates having 1 to about 20 ethylene oxide groups; C6-C24 alkylphenol ethoxylates having 1 to about 100 ethylene oxide groups; C6-C24 alkylpolyglycosides having 1 to about 20 glycoside groups; C6-C24 fatty acid ester ethoxylates, propoxylates or glycerides; and C4-C24 mono or dialkanolamides.

If a surfactant is used as a penetrant, the amount of surfactant in the pre-treatment solution is typically at least 0.25% and no greater than 10 wt-%. Common levels of surfactant include 0.4 to 8 wt-%, and 1 to 4 wt-%.

Overall, when an alkaline or acid source is present, the amount of penetrant in the pre-treatment solution is typically at least 0.2 wt-% and no greater than 2.5 wt-%. Common levels of penetrant, when an alkaline or acid source is present, include 0.4-2 wt-%; 1-2 wt-% is preferred. The amount of penetrant, in relation to any alkaline or acid source when present, is generally 1:1 to 1:5.

For pre-treatment solutions without an alkaline or acid source, the amount of penetrant in the solution is at least 0.05 wt-% and no greater than 50%. Typically, the level is 0.1 to 25 wt-%. Common levels of penetrant include 0.5 to 10 wt-%, and 1 to 5 wt-%.

Oxidizers

Acidic solutions may include an oxidizing agent or an oxidizer, such as a peroxide or peroxyacid. The resulting solution is very effective against protein soils. Further, reaction of these oxygen compounds with the soil, especially when combined with an alkaline source, creates vigorous mechanical action on and within the soil, which enhances removal of the soil beyond that caused by the chemical action.

Suitable ingredients are oxidants such as chlorites, bromine, bromates, bromine monochloride, iodine, iodine monochloride, iodates, permanganates, nitrates, borates, perborates, and gaseous oxidants such as ozone, oxygen, chlorine dioxide, chlorine, sulfur dioxide. Peroxygen compounds, which include peroxides and various percarboxylic acids, including percarbonates, are suitable. Typical peroxygen compounds include hydrogen peroxide ($H_2O_2$), peracetic acid, a persulphate, or a percarbonate.

The amount of oxidant in the pre-treatment solution is typically at least 0.01 wt-% and no greater than 1 wt-%. Common levels of oxidant are 0.01 to 0.25 wt-%; 0.05 wt-% is a particularly suitable and common level. Suitable levels of oxidant, in relation to any acid source, are generally 2:1 to 1:2000. Common levels are 1:2 to 1:100, more common 1:20 to 1:50. Solutions of 0.25 wt-% to 10 wt-% phosphoric acid with 50-5000 ppm (0.005 wt-% to 0.5 wt-%) hydrogen peroxide are particularly suitable. An example pre-treatment solution includes 0.75 wt-% phosphoric acid and 500 ppm (0.05 wt-%) hydrogen peroxide, which is a 1:15 ratio of oxidant:acid.

Builders

The pre-treatment solution preferably includes a builder. Builders include chelating agents (chelators), sequestering agents (sequestrants), detergent builders, and the like. The builder often stabilizes the composition or solution. Examples of builders include phosphonic acids and phosphonates, phosphates, aminocarboxylates and their derivatives, pyrophosphates, polyphosphates, ethylenediamene and ethylenetriamene derivatives, hydroxyacids, and mono-, di-, and tri-carboxylates and their corresponding acids. Other builders include aluminosilicates, nitroloacetates and their derivatives, and mixtures thereof. Still other builders include aminocarboxylates, including salts of ethylenediaminetetraacetic acid (EDTA), hydroxyethylenediaminetetraacetic acid (HEDTA), and diethylenetriaminepentaacetic acid. Preferred builders are water soluble.

Particularly preferred builders include EDTA (including tetra sodium EDTA), TKPP (tripotassium polyphosphate), PAA (polyacrylic acid) and its salts, phosphonobutane carboxylic acid, and sodium gluconate.

The amount of builder in the pre-treatment solution, if present, is typically at least 0.25 wt-% and no greater than 5 wt-%. Common levels of builder include 0.5 to 1.0 wt-% and 1 wt-% to 2.5 wt-%.

Methods of Pre-Treating

The method of the present invention is directed to applying the pre-treatment solution to the surface to be cleaned, prior to a conventional CIP process. The resulting CIP process requires less steps and/or less time for each step. For example, a conventional CIP process includes five steps after an initial water rinse: a conventional alkaline (NaOH) wash to remove soil, an interim rinse, a conventional acid wash to remove minerals and scale, a water rinse, and a conventional sanitizing step. This process can be replaced with a three-step process after the initial water rinse: an acidic pre-treatment step, a conventional alkaline wash, and a water rinse. Alternately, the three-step process can be: an alkaline pre-treatment step, a conventional acidic wash, and a water rinse. By using such a process, an interim rinse is not needed, as the reaction between the acid and base in separate steps is desired.

By using either of the two pre-treatment processes described immediately above, the amount of water used in the overall cleaning process with pre-treatment is reduced by about 30% compared to the conventional five-step process. The amount of time for the overall process with pre-treatment is reduced by about 30% compared to the conventional five-step process. The specific number of steps, the water usage, or the processing time reduced will depend on the concentration and chemistry of the pre-treatment solution.

Referring again to FIG. 1, pre-treatment solution is stored at the equipment designated as 40. In this process 10, tank 42 holds an alkaline pre-treatment solution and tank 44 holds an acidic pre-treatment solution that includes peroxide.

To clean 20, tank 20 and its connection lines are drained of any product that may be present. A water rinse may be included to remove any residual product. In one embodiment, alkaline pre-treatment solution from tank 42 is pumped via piping and feed line 25 into tank 20. Conventional CIP application equipment, such as a spray head, applies the pre-treatment solution onto the interior surface of tank 20. The pre-treatment solution cascades or otherwise flows down the surface of tank 20, softening the soil. A second application of pre-treatment solution may be applied, although this is not generally needed.

After application and draining of the pre-treatment solution, a conventional CIP process, using the detergent from process 30 and tank 35, is performed. The CIP detergent may be acidic or alkaline. Detergent from tank 35 is recirculated through tank 20 via feed line 25, return line 27, and other appropriate piping.

In another embodiment, a pre-treatment solution containing hydrogen peroxide from tank 44 is pumped via piping and feed line 25 into tank 20. After application and draining of the peroxide pre-treatment solution, a conventional CIP process, using an alkaline detergent such as sodium hydroxide, from process 30 and tank 35, is performed. The sodium hydroxide activates any residual peroxide on the walls of tank 20.

Various generic examples of suitable pre-treatment steps are provided below.

In one particular example, an alkaline pre-treatment solution of 10 wt-% NaOH is sprayed onto the interior surfaces of a holding tank and allowed to drain. After about 20 minutes, the CIP process, having a 1% acidic solution, is initiated.

In a second particular example, an acidic pre-treatment solution of 1 wt-% phosphoric acid is circulated onto the interior surfaces of a plate-in-frame heat exchanger. The solution includes 0.1 wt-% $H_2O_2$. The acid, together with the peroxide, provides an effervescence effect, providing mechanical action to help soften and remove the soil. The peroxide is also catalytically activated by a subsequent conventional alkaline CIP solution which causes further effervescence and soil removal.

In a third particular example, an acidic pre-treatment solution, having about 1.0 wt-% mineral acids and 1.0 wt-% solvent penetrant, is circulated onto the heat exchanging surfaces of an evaporator and drained from the surface. After about 20 minutes, the CIP process is initiated. A conventional alkaline wash, approx. 0.5 wt-% active NaOH, is fed into the evaporator. The alkaline reacts with any acidic residue, generating heat and mechanical action furthering the removal of the soil.

EXAMPLES

Example 1

Test Procedure

Solid milk pellets were prepared by mixing 3 grams of dry milk power and 3 grams of soil. The resulting mix was pressed in a die for 30 seconds at 10,000 lb, and then more pressure was added to again apply 10,000 lb for 30 additional seconds. The pellets were placed in screens and immersed in the pre-treatment solutions, described below, for 5 minutes, removed, and then drained for 5 minutes. The screen and dried pellets were placed in a beaker of 0.5 wt-% NaOH at 120° F. (The test designated as "None" had no pre-treatment step; the test designated as "None *" had no pre-treatment step and used a 3.0% NaOH cleaning at 120° F., rather than the 0.5% NaOH). The beakers were placed on a hot plate set to 49° C. (approx. 120° F.) with large stir bars rotating at 350 rpm. After 30 minutes, the screen and pellets were removed from the cleaning solution and gently immersed in and removed from deionized water five times, and then dried overnight in a 50° C. oven. The results of the testing are below.

Pre-Treatment 1

A 10 wt-% solution of active NaOH was prepared and used as a pre-treatment. The pre-treatment had 100,000 ppm sodium hydroxide (an alkaline cleaner).

Pre-Treatment 2

A pre-treatment solution was prepared having 1360 ppm tetra sodium EDTA (a builder and/or chelant), 3000 ppm sodium gluconate (a builder and/or chelant), 2400 ppm potassium silicate (an alkaline cleaner), 7000 ppm alkyl polyglycoside (a surfactant), and 4200 ppm potassium hydroxide (an alkaline cleaner). This Pre-Treatment 2 had 3.66% alkaline, 0.43% builder/chelant, and 0.7% surfactant, providing 4.79% active ingredients.

Pre-Treatment 3

A pre-treatment solution was prepared having 41550 ppm polycarboxylated alcohol ethoxylate (a surfactant), 9540 ppm octyl amine oxide (a surfactant), 25500 ppm alkyl polyglycoside (a surfactant), and 4150 ppm 2-ethylhexanol ethoxylate (a penetrant). This Pre-Treatment 3 had 0.4% penetrant and 7.6% surfactant, providing 8% active ingredients.

Pre-Treatment 4

A pre-treatment solution was prepared having 1600 pm potassium hydroxide (an alkaline cleaner), 9465 ppm sodium hydroxide (an alkaline cleaner), 18500 ppm polyacrylic acid (a builder and/or chelant), and 4625 ppm phosphonobutane tricarboxylic acid (a builder and/or chelant). This Pre-Treatment 4 had 1.10% alkaline and 2.3% builder/chelant, providing 2.9% active ingredients.

| Pre-Treatment solution | Screen wt (g) | screen + pellet wt, before clean (g) | screen + pellet wt, after clean (g) | pellet wt before clean (g) | pellet wt after clean (g) | % wt loss of pellet |
|---|---|---|---|---|---|---|
| 1 | 18.23 | 23.93 | 22.59 | 5.70 | 4.36 | 23.51% |
| 1 | 18.20 | 23.86 | 22.52 | 5.66 | 4.32 | 23.67% |
| 2 | 18.23 | 23.91 | 22.54 | 5.68 | 4.31 | 24.12% |
| 2 | 18.02 | 23.34 | 22.08 | 5.32 | 4.06 | 23.68% |
| 3 | 19.24 | 24.70 | 22.14 | 5.46 | 2.90 | 46.89% |
| 3 | 18.06 | 23.67 | 21.19 | 5.61 | 3.13 | 44.21% |
| 4 | 17.95 | 23.50 | 20.09 | 5.55 | 2.14 | 61.44% |
| 4 | 18.22 | 23.90 | 21.69 | 5.68 | 3.47 | 38.91% |
| None | 19.16 | 24.81 | 23.22 | 5.65 | 4.06 | 28.14% |
| None | 13.47 | 18.76 | 17.22 | 5.29 | 3.75 | 29.11% |
| None* | 19.27 | 25.01 | 24.14 | 5.74 | 4.87 | 15.16% |
| None* | 18.15 | 23.82 | 23.02 | 5.67 | 4.87 | 14.11% |

The results show both consistency within the cleaning processes and differences when comparing the methods. The results indicate that lower levels of NaOH are better than higher levels, and that pre-treatment solutions 3 and 4 are superior to pre-treatment solutions 1 and 2. This difference, however, may be due to the test procedure used. Tests 1 and 2 were done on one hot plate whereas tests 3 and 4 were done on a second hot plate. It is possible that these two hot plates were not equal at maintaining the 120° F. temperature.

A drastic difference was seen between the duplicate tests (i.e., 61% and 39% for solution 4); it is possible that one of the pellets had a crack in it, providing a weak location for the pellet to break. The high exposed surface area would result in an increase rate if disintegration.

The tests were rerun on the same hotplate in an attempt to determine if there was any inconsistency between temperature control of the hotplates. The results are provided in the table below, under the column designated "% wt loss of pellet with pre-treat".

As an alternative, and comparative method, 1 gram of the Pre-treatment solution were added to 315 grams of the 0.5% NaOH cleaning solution. Thus, rather than applying the pre-treatment chemistry as a separate step, the pre-treatment chemistry was added to the cleaning solution. The results are provided in the table below, under the column designated "% wt loss of pellet without pre-treat".

| Pre-treatment | % wt loss of pellet with pre-treat | % wt loss of pellet without pre-treat |
|---|---|---|
| 1 | 22.16% | 36.92% |
| 2 | 23.90% | 37.39% |
| 3 | 41.96% | 34.01% |
| 4 | 50.17% | 31.95% |

The results indicate that eliminating the separate pre-treatment step and adding the chemicals directly to the cleaning solution increased the performance of the two less effective solutions (1—10% NaOH; 2—10% KX-3108) and decreased the performance of the two more effective solutions (3—10% Quadexx 400; 4—10% Quadexx 500). All of these results were better than if no pre-treatment was present (which provided pellet loss of about 29%).

Example 2

Test Procedure

Soiled stainless steel test panels, having soil on one side, were prepared by drying a mixture of mashed corn solids onto one side of the panel in an oven at 120° C. for 4 hours. The soiled panels were then cleaned as described below.

For Test (I), with the pre-treatment step, 800 grams of Pre-Treatment solution 5 were placed in a 1000 ml beaker. It had been determined that approximately 1 gram of the pre-treatment solution contacted and remained on the soiled panel. After a brief dip in the pre-treatment, the panels were hung for 5 minutes in ambient conditions. The dried panels were then placed in a 1000 ml beaker which had 750 g of 40° C. water with the soil side down. After 30 minutes, the panels were gently immersed in and removed from deionized water five times, and the panels were then dried. The results of the testing are below.

For Test (II), the test panels were not pre-treated, but were cleaned in 750 g of 40° C. water with 1 g Pre-Treatment 5 added to the water.

For Test (III) the test panels were not pre-treated, but were cleaned in 750 g of 40° C. water.

Pre-Treatment 5

A pre-treatment solution was prepared having 400 ppm tetra sodium EDTA (a builder and/or chelant), 4500 ppm tri potassium polyphosphate (a builder and/or chelant), 3852 ppm potassium hydroxide (an alkaline cleaner), 3000 ppm polyethylene phenol ether phosphate (a surfactant), 1000 ppm sodium metasilicate (an alkaline cleaner), 9000 ppm ethylene glycol monobutyl ether (a penetrant), and 2400 ppm sodium xylene sulfonate (a surfactant). This Pre-Treatment 5 had 0.5% alkaline, 0.5% builder/chelant, 0.5% surfactant, and 0.9% penetrant, providing 2.4% active ingredients.

| Test Method | average % soil removed |
|---|---|
| I | 99.12% (average of three tests) |
| II | 14.14% (average of three tests) |
| III | 14.12% (average of two tests) |

The results above show that merely adding the pre-treatment chemistry to the wash solution, does not improve the soil removal from the test panels. Rather, separated and stepwise application of the pre-treatment solution and the wash solution provides improved soil removal.

The invention has been described with reference to various specific and preferred embodiments and techniques. However, it should be understood that many variations and modifications may be made while remaining within the spirit and scope of the invention.

What is claimed:

1. A method of cleaning soils from industrial equipment having a heat exchanger using a CIP process, the method comprising:
   (a) applying an acidic pre-treatment solution to the soil, the solution comprising
      0.25 to 1.5 wt. % acid;
      0.01 to 1 wt. % oxidant;
      and 0.05 to 10 wt. % of a penetrant selected from the group consisting of alcohols, short chain ethoxylated alcohols, phenol, organic solvents, ethoxylated alcohols, glycol ethers, and surfactants;
   (b) allowing the pre-treatment solution to partially remain on the soil for a period of time sufficient to facilitate soil removal;
   (c) circulating a first heated solution through the equipment, the solution comprising about 0.5 wt. % of an alkaline detergent comprising NaOH; wherein there is not a rinse step between applying the pre-treatment solution and applying the first solution; and
   (d) rinsing the equipment.

2. The method according to claim 1, wherein the pre-treatment solution comprises:
   (a) 0.25 to 1.5 wt-% acid selected from the group consisting of phosphoric acid, nitric acid, sulfuric acid, lactic acid, acetic acid, hydroxyacetic acid and citric acid; and
   (b) 0.01 to 1 wt-% oxidant comprising a peroxygen compound.

3. The method according to claim 2, wherein the peroxygen compound is present at a level of 0.05 to 0.5 wt-%.

4. The method according to claim 1, wherein the pre-treatment solution comprises 0.25 to 1.5 wt-% acid and 0.01 to 1 wt-% oxidant.

5. A method of cleaning soil from industrial equipment having a heat exchanger using a CIP process, the method comprising:
   (a) pre-treating the soil with a pre-treatment solution comprising at least 0.5 wt-% active ingredients, the active ingredients selected from the group consisting of an alkaline source, a penetrant, an oxidizer, a surfactant, a builder and mixtures thereof; and immediately thereafter
   (b) removing at least a portion of the pre-treated soil with a dilute acidic detergent solution; wherein there is a chemical reaction between the pre-treatment solution and the dilute detergent solution, and there is not a rinse step between applying the pre-treatment solution and applying the dilute detergent solution; and
   (c) rinsing the equipment.

6. A method of cleaning soils from industrial equipment having a heat exchanger using a CIP process, the method comprising:
   (a) applying a pre-treatment solution to the soil, the solution comprising
      0.25 to 1.5 wt. % acid;
      0.01 to 1 wt. % oxidant;
      and 0.05 to 10 wt. % penetrant selected from the group consisting of alcohols, short chain ethoxylated alcohols, phenol, organic solvents, ethoxylated alcohols, glycol ethers, and surfactants;
   (b) allowing the pre-treatment solution to partially remain on the soil for a period of time sufficient to facilitate soil removal;
   (c) circulating a first heated solution through the equipment after the pre-treatment solution, the solution comprising a dilute detergent; wherein there is not a rinse step between applying the pre-treatment solution and applying the first solution; and
   (d) circulating a second CIP solution through the equipment after the first solution; and then
   (e) rinsing the equipment.

7. The method according to claim 6, wherein the step of applying a pre-treatment solution comprises:
   (a) applying a pre-treatment solution comprising 0.25 to 1.5 wt-% acid and 0.01 to 1 wt-% oxidant.

8. The method according to claim 7, wherein the step of applying a pre-treatment solution comprises:
   (a) applying a pre-treatment solution comprising 0.25 to 1.5 wt-% acid and 0.05 to 0.5 wt-% oxidant.

9. The method according to claim 7, wherein the oxidant is a peroxide.

10. The method according to claim 6, wherein the pre-treatment solution is acidic and the first solution is alkaline.

* * * * *